US012697848B1

(12) United States Patent (10) Patent No.: US 12,697,848 B1

Tam et al. (45) Date of Patent: Aug. 4, 2026

(54) SYSTEM AND METHOD FOR ADJUSTING A DAMPER OF A VEHICLE IN ANTICIPATION OF CHANGING ROAD CONDITIONS

(71) Applicant: FCA US LLC, Auburn Hills, MI (US)

(72) Inventors: Toon Shin Tam, Auburn Hills, MI (US); Kushal Chirag Shah, Auburn Hills, MI (US); Benjamin L. Cottrill, Auburn Hills, MI (US); Peter W. LaVallee, Auburn Hills, MI (US); Kanishk Bakshi, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 19/271,905

(22) Filed: Jul. 17, 2025

(51) Int. Cl.
  B60G 17/016 (2006.01)
  B60G 17/06 (2006.01)

(52) U.S. Cl.
  CPC ......... B60G 17/0162 (2013.01); B60G 17/06 (2013.01); *B60G 2400/41* (2013.01); *B60G 2500/10* (2013.01); *B60G 2600/184* (2013.01)

(58) Field of Classification Search
  CPC ....... B60B 19/14; B60B 19/003; B60B 33/08; B25J 5/007; B25J 9/1664; B25J 9/1697
  See application file for complete search history.

(56) References Cited

U.S. PATENT DOCUMENTS

| | | | | |
|---|---|---|---|---|
| 6,418,360 | B1 * | 7/2002 | Spivey | G01M 17/04 73/11.04 |
| 11,904,648 | B2 * | 2/2024 | Graus | B60G 15/06 |

| | | | | |
|---|---|---|---|---|
| 11,932,072 | B2 * | 3/2024 | Praet | B60G 17/018 |
| 2010/0044975 | A1 * | 2/2010 | Yablon | B60G 17/08 188/282.8 |
| 2015/0217816 | A1 * | 8/2015 | Franck | B62D 55/1086 305/142 |
| 2018/0326810 | A1 * | 11/2018 | Masamura | B60G 17/0165 |
| 2018/0339566 | A1 * | 11/2018 | Ericksen | B60G 17/016 |
| 2020/0386292 | A1 * | 12/2020 | Oblizajek | F16F 9/18 |
| 2021/0162831 | A1 * | 6/2021 | Edren | B60G 17/0165 |
| 2021/0354523 | A1 * | 11/2021 | Hirao | B60G 17/015 |
| 2021/0362806 | A1 * | 11/2021 | Hedlund | B62M 27/02 |
| 2022/0297495 | A1 * | 9/2022 | Sawarynski | B60G 17/0165 |
| 2024/0300275 | A1 * | 9/2024 | Anderson | B60G 17/00 |
| 2025/0065894 | A1 * | 2/2025 | Luo | B60W 50/06 |
| 2025/0282194 | A1 * | 9/2025 | Graus | B60G 17/0164 |
| 2025/0304162 | A1 * | 10/2025 | Kohler | B62D 11/14 |
| 2026/0091635 | A1 * | 4/2026 | Light | B60G 17/0165 |

OTHER PUBLICATIONS

Polaris Off-Road Vehicles; Dynamix DV Semi-Active Suspension; May 20, 2024 (5 pages).

* cited by examiner

*Primary Examiner* — Toan C To

(74) *Attorney, Agent, or Firm* — Jeremy J. Klobucar

(57) ABSTRACT

A method for adjusting a damper of a vehicle may include receiving a signal from a control, determining that one or more parameter thresholds are not met, increasing a compression resistance of one or more dampers from a first compression resistance to a second compression resistance, determining that an actuation threshold has occurred, and reducing the compression resistance of the one or more dampers from the second compression resistance to or toward the first compression resistance after the actuation threshold has occurred.

20 Claims, 5 Drawing Sheets

42

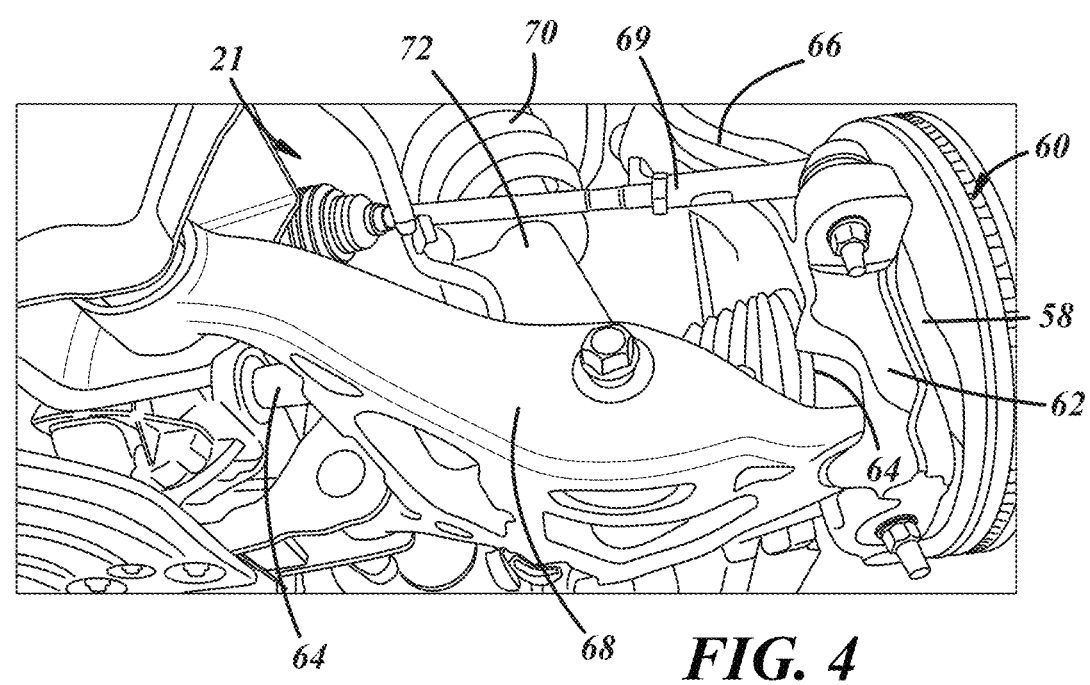
*FIG. 4*
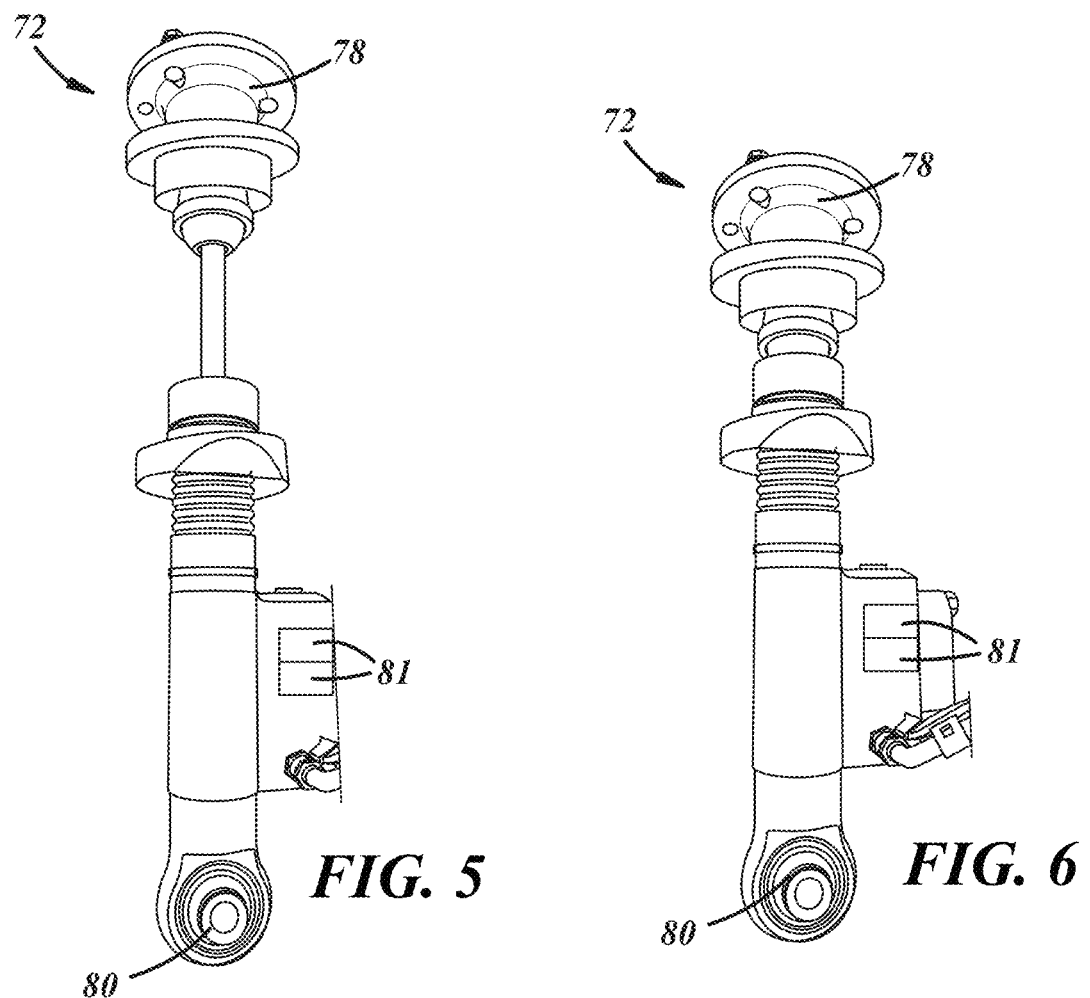
*FIG. 5*
*FIG. 6*

SYSTEM AND METHOD FOR ADJUSTING A DAMPER OF A VEHICLE IN ANTICIPATION OF CHANGING ROAD CONDITIONS

FIELD

The present disclosure relates to a system and method for adjusting a damper of a vehicle in anticipation of changing road conditions.

BACKGROUND

Vehicles may encounter dips, ditches, or potholes in the road surface. When the vehicle enters the dip, ditch, or pothole, the force of the vehicle may cause the suspension to fully compress and bottom out. Once the suspension system is fully compressed, the momentum of the vehicle and impact force may be transferred to the frame and body of the vehicle, which may result in damage to the vehicle and discomfort to vehicle occupants.

SUMMARY

In at least some implementations, a method for adjusting a damper of a vehicle includes receiving a signal from a control, determining that one or more parameter thresholds are not met, increasing a compression resistance of one or more dampers from a first compression resistance to a second compression resistance, determining that an actuation threshold has occurred, and reducing the compression resistance of the one or more dampers from the second compression resistance to or toward the first compression resistance after the actuation threshold has occurred.

In at least some implementations, the one or more parameter thresholds include a maximum steering angle of a wheel or that the one or more dampers have been above a predetermined level of compression resistance for a predetermined time or that an amount of actuations of the control per a predetermined amount of time is more than a predetermined amount.

In at least some implementations, the second compression resistance is a maximum compression resistance.

In at least some implementations, the one or more dampers includes front dampers of the vehicle, and the front dampers are adjusted to the maximum compression resistance.

In at least some implementations, the front dampers are adjusted to a minimum rebound resistance.

In at least some implementations, increasing the first compression resistance of the one or more dampers to the second compression resistance includes providing a notification to indicate that the compression resistance of the one or more dampers has been adjusted.

In at least some implementations, determining that an actuation threshold has occurred includes determining that the one or more dampers have been compressed beyond a predetermined amount.

In at least some implementations, reducing the compress resistance of the one or more dampers from the second compression resistance to or toward the first compression resistance includes reverting the front dampers from the maximum compression resistance to the first compression resistance and reverting the front dampers from the minimum rebound resistance to the rebound resistance prior to adjusting the rebound resistance to the minimum rebound resistance.

In at least some implementations, the step of reducing the compression resistance of the one or more dampers includes providing a notification to indicate that the damper compression resistance has been reduced.

In at least some implementations, the maximum steering angle is 8 degrees or greater.

In at least some implementations, a vehicle includes a frame configured to support components of the vehicle, a body supported by the frame, wherein the body defines an exterior of the vehicle and a passenger compartment within the body of the vehicle, a damper having a first end coupled to the frame and the damper has a second end that is movable relative to the first end, a wheel coupled with the second end of the damper, wherein the wheel and the second end of the damper can move relative to the frame, a control actuatable from within the passenger compartment, and a control system capable of receiving a signal from the control, determining that one or more parameter thresholds are not met, increasing a compression resistance of one or more dampers from a first compression resistance to a second compression resistance, determining that an actuation threshold has occurred, and reducing the compression resistance of the one or more dampers from the second compression resistance to or toward the first compression resistance.

In at least some implementations, the one or more parameter thresholds include a maximum steering angle of a wheel or that the one or more dampers have been above a predetermined level of compression resistance for a predetermined time or that an amount of actuations of the control per a predetermined amount of time is more than a predetermined amount.

In at least some implementations, increasing the first compression resistance of the damper to the second compression resistance includes adjusting one or more dampers to a maximum compression resistance.

In at least some implementations, front dampers of the vehicle are adjusted to the maximum compression resistance.

In at least some implementations, the front dampers are adjusted to a minimum rebound resistance.

In at least some implementations, increasing the first compression resistance of the damper to the second compression resistance includes providing a notification to indicate that the compression resistance of the one or more dampers has been adjusted.

In at least some implementations, increasing the first compression resistance of the damper to the second compression resistance includes providing a notification to indicate that the compression resistance of the one or more dampers has been adjusted.

In at least some implementations, reducing the compression resistance of the one or more dampers from the second compression resistance to or toward the first compression resistance includes reducing the front dampers from the maximum compression resistance to the first compression resistance and increasing the front dampers from the minimum rebound resistance to the rebound resistance prior to adjusting the rebound resistance to the minimum rebound resistance.

In at least some implementations, reducing the compression resistance of the one or more dampers from the second compression resistance to or toward the first compression resistance includes providing a notification to indicate that the damper compression resistance has been changed.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

BRIEF DESCRIPTION OF THE DRAWINGS

FIG. 4 is a view of components of a suspension system of the vehicle;

FIG. 5 is a damper of the vehicle in an extended position;

FIG. 6 is a damper of the vehicle in a compressed position;

DETAILED DESCRIPTION

Figure 1:
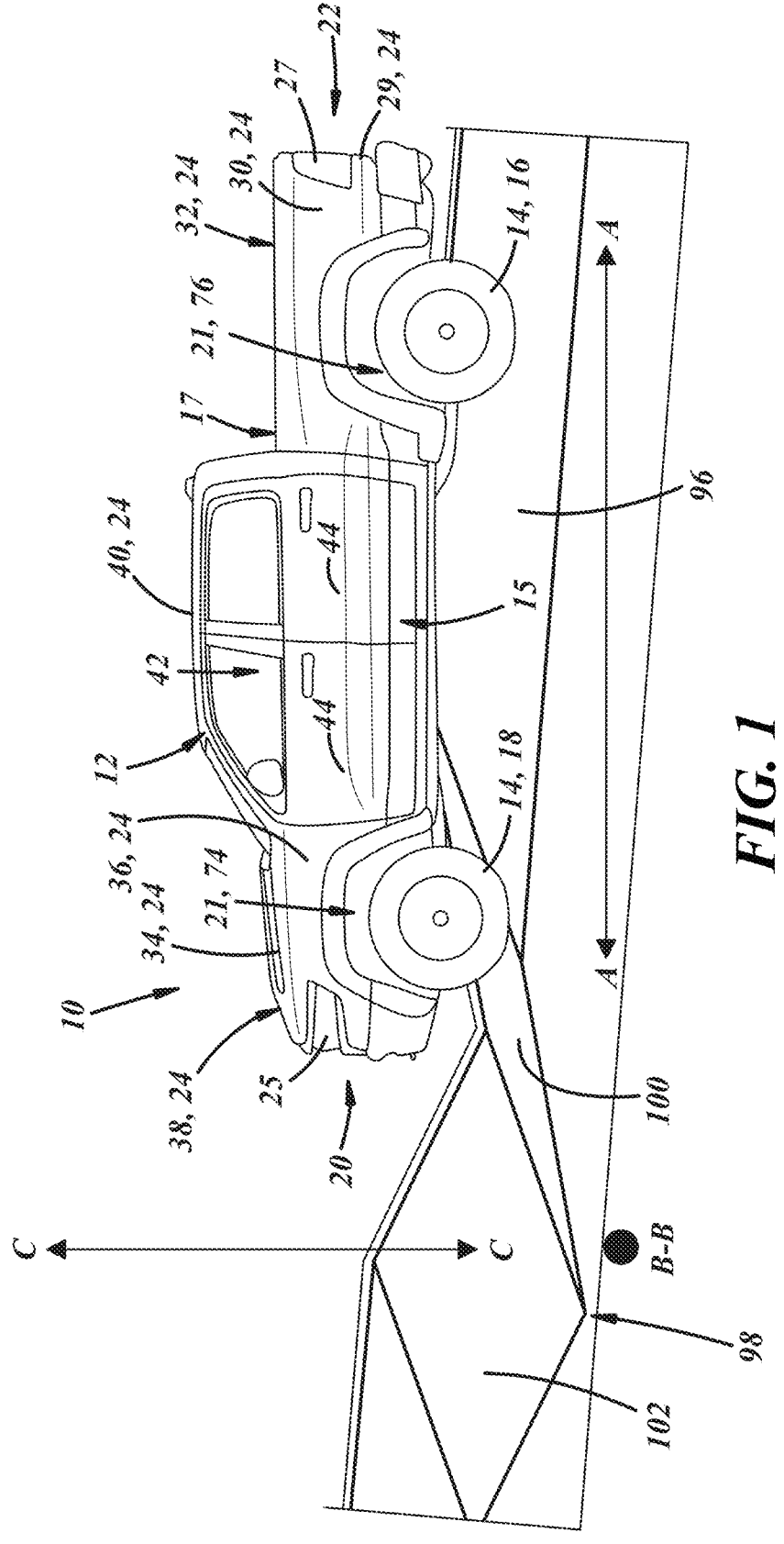
FIG. 1 is a side view of a vehicle, a driving surface, and a dip in the driving surface.

Referring in more detail to the drawings, FIG. 1 illustrates a vehicle 10 having a frame (which may be any type of a support structure for components of the vehicle 10), a body 12, and multiple wheels 14 coupled to the frame by various suspension components. The wheels 14 include two rear wheels 16 that are spaced apart laterally, in what is sometimes called a cross-car direction, extending between driver and passenger (or left and right) sides 15, 17 of the vehicle 10, and as shown by arrow AA. The wheels 14 also include two front wheels 18 that are laterally spaced apart from each other and longitudinally spaced from the rear wheels 16, in a fore-aft direction extending between a front and a rear 20, 22 of the vehicle 10, as shown by arrow BB. The body 12 is suspended off the ground by the wheels 14, the suspension system 21, and the frame in a vertical direction shown by arrow CC (see FIG. 1), which is parallel to the direction of gravity when the vehicle 10 is on a flat, level surface that is oriented perpendicular to gravity.

The vehicle body 12 is defined at least in part by multiple body panels 24. A front fascia 28 defines the front end 20 of the vehicle 10 and includes one or more body panels 24, bumpers, headlights 25, taillights 27, grilles, and the like. A rear fascia 29 covers the rear end 22 of the vehicle 10, and left and right sides of the rear fascia are adjacent to left and right rear body panels 30, 32 (e.g. rear quarter panels). Taillights 27 may be mounted at the rear of the vehicle 10 and may be integrated with the rear fascia. A hood 34 spans laterally, in the cross-car direction between left and right front body panels 36, 38 (sometimes called front quarter panels) that overlap the front wheels 18, and the hood 34 extends longitudinally rearward from the front fascia 28 in the fore-aft direction. The roof 40 defines a top-portion of the body 12, and covers a top-portion of a passenger compartment 42 of the vehicle 10. Some body panels 24 such as the fascias 28, 29, the quarter panels 30, 32, 36, 38, and roof 40 may be fixed body panels, while others such as the hood 34 and doors 44 may be movable body panels that can be moved in at least one direction relative to the fixed body panels.

Figure 2:
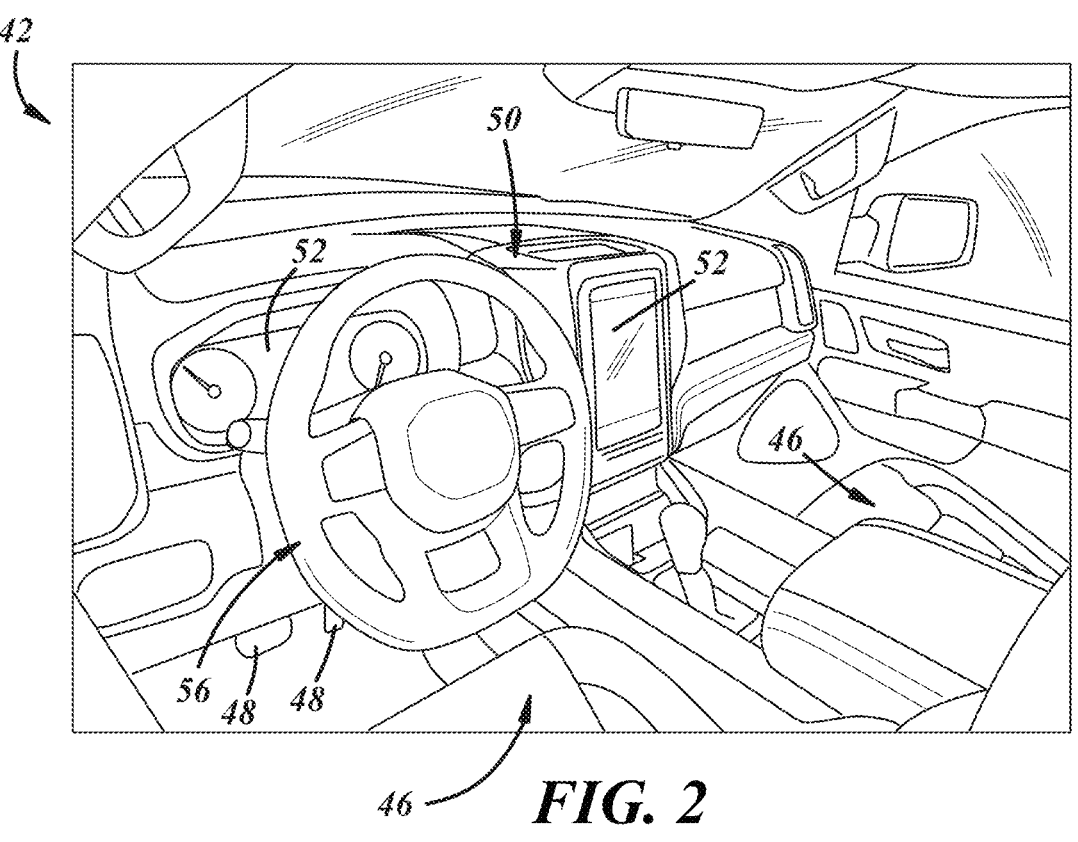
FIG. 2 is a perspective view of a passenger compartment of the vehicle.

As shown in FIG. 2, the passenger compartment 42 may include one or more seats 46 to support vehicle occupants including an operator of the vehicle 10. A steering wheel may be positioned in front of one of the seats 46, and is used by the operator to steer the vehicle 10. One or more pedals 48 may be positioned near the floor of the passenger compartment 42 and may configured to control the acceleration and braking of the vehicle 10. The passenger compartment 42 may also include a dashboard 50 with one or more displays 52 configured to show information or images to vehicle occupants and one or more switches or buttons configured to receive input from the operator or other vehicle occupants.

Figure 3:
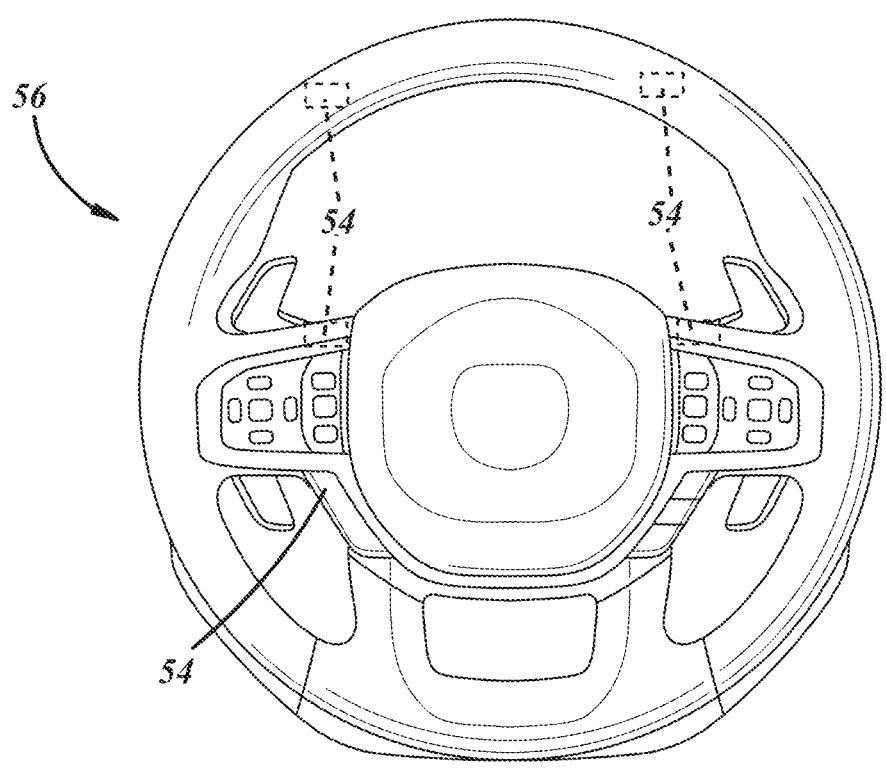
FIG. 3 is a front view of a steering wheel of the vehicle with a control.

Within the passenger compartment 42, a control 54 is provided so that it may be actuated by the operator to cause a change in the suspension system 21. For example, as shown in FIG. 3, the control 54 may be positioned on the steering wheel 56 as a button or switch actuatable by a hand of the operator. It may be desirable to position the control 54 on the steering wheel 56 so that the operator may keep hands on the steering wheel 56 while actuating the control 54. Representative and non-limiting examples of other locations for the control 54 when implemented as an input/switch on the steering wheel 56 are shown by dashed line rectangles in FIG. 3. However, other positions or implementations of the control 54 on or off the steering wheel 56 are possible. For example, the control 54 may be one of the buttons or switches on the dashboard 50, or in implementations where the displays 52 are touch-sensitive and are configured to receive input from the operator, the control 54 may be actuated through the one or more displays 52 of the vehicle 10.

FIG. 4 shows an example of the suspension system 21 by which the wheels 14 are coupled to the frame of the vehicle 10. Each wheel 14 is mounted to a wheel hub 58 which supports the wheel 14 among other components, such as a brake rotor 60. The hub 58 is rotationally coupled to a hub carrier 62 so that the hub 58 can rotate relative to the hub carrier 62. A shaft 64 or axle is coupled to the hub 58 and is configured to rotate with the hub 58 relative to the hub carrier 62. One or more of the shafts 64 or axles are rotated by the powertrain system to provide rotational power from the powertrain system to one or more wheels 14. The hub carrier 62 may be supported by an upper control arm 66 and a lower control arm 68. In some implementations, a steering arm 69 may extend between a steering rack (not pictured), that is actuatable by or in response to movement of the steering wheel 56, and the hub carrier 62 to control the direction of the hub carrier 62 and the wheel 14. In other implementations, for example on some vehicle's rear suspension, where steering may not be required, the steering rack may be replaced with a control arm that is fixed the frame to maintain the direction of the wheel 14. A spring 70 and a damper 72 (e.g. a shock absorber) extends between the lower control arm 68 and the frame of the vehicle 10 at each wheel 14, so that each of the front wheels 18 has a front damper (collectively front dampers 74) and each of the rear wheels 16 has a rear damper (collectively rear dampers 76). The spring 70 supports the weight of the vehicle 10 and absorbs energy from impacts, compressing when the wheel 14 hits a bump and expanding afterward to help maintain tire contact with the road. The damper 72 controls the motion of the spring 70 by providing resistance through fluid actuated by a piston within the damper 72. This resistance slows down the spring 70's compression and rebound, reducing bounce, improving ride comfort, and enhancing handling by keeping the tires more stable and in contact with the road.

As shown by FIGS. 5-6, the damper 72 has a first end 78, connected to the frame, as shown in FIG. 4, and a second end 80 connected to the lower control arm 68 where it is coupled with the wheel 14. The second end 80 is movable relative to the first end 78 between two positions, an extended position (FIG. 5), and a compressed position (FIG. 6). As the damper 72 moves towards the compressed position, the fluid within the damper 72 resists the movement of the piston, so that the damper 72 resists the compression of the second end 80 towards the first end 78. As the damper 72 moves towards the extended position, the fluid with the damper 72 resists the movement of the piston, so that the damper 72 resists the extension of the second end 80 away from the first end 78.

In at least some implementations, the dampers 72 may be configured to alter the flow of fluid within the damper 72 to control the compression resistance and rebound (extension) resistance of the damper 72. For example, the damper 72 may have one or more than one electronically actuated valve 81 that can change the resistance that the piston experiences as it travels through the fluid. The valve(s) 81 may open to permit fluid to flow more freely or close to restrict the flow of fluid. The valve(s) 81 may control either the compression resistance, the rebound resistance, or both the compression resistance and the rebound resistance. In at least some implementations the damper 72 may have two electronically actuated valves 81, where a first valve controls the compression resistance of the damper and the second valve controls the rebound resistance of the damper. In this way, the compression resistance and rebound resistance may be adjusted independently of each other, enabling more precise control of the damper 72. In at least some implementations, the damper fluid may contain iron particles that are reactive to electromagnetic fields. An electromagnet (coil) may be present within the damper 72 that may output varying levels of magnetic force. As the magnetic force is increased, the fluid obtains a thicker viscosity and thus provides higher compression resistance and rebound resistance. By varying the magnetic force, the compression resistance and rebound resistance can be adjusted in real-time.

In at least some implementations, the damper 72 may have a position sensor 82, capable of determining the position of the damper 72 between the extended and compressed positions. The position sensor 82 may be integrated with the damper 72 such as, but not limited to, a contactless linear position sensor or a Hall Effect sensor. The position sensor 82 may also be external to the damper 72 such as a linear potentiometer that moves with the damper piston or a sensor mounted on neighboring vehicle components. In at least some implementations the position of the damper 72 may be inferred utilizing mathematical models that input information, for example, such as the speed of the vehicle 10 and acceleration of the vehicle 10, which may be determined using one or more accelerometers positioned on the vehicle 10. The position of the damper 72 may also be determined using a ride height sensor that is configured to determine the height of the vehicle body 12 relative to the wheels 14 of the vehicle 10.

The vehicle 10 may also include an infotainment system 84 capable of communicating information to an occupant of the vehicle 10 and for receiving inputs from an occupant. The infotainment system 84 may include one or more displays 52 visible by one or more vehicle occupants within the interior of the vehicle 10, a tactile feedback system capable of tactilely communicating information to a user, or a speaker capable of audibly communicating information to the user. For example, the display 52 may be part of a gauge cluster or center console and the infotainment system 84 may be provided as desired within the vehicle 10. Via the infotainment system 84, various vehicle controls may be implemented or selected by a user, such as by a touch screen or other inputs like buttons or dials, and by which a remote device may be connected (e.g. a smart phone) and audio (e.g. radio/sound system) and other devices or systems may be accessed for user control. To manage operation of the infotainment system 84 and related devices, components and systems, the infotainment system 84 is part of or communicated with a vehicle control system 86.

The infotainment system 84 may include a notifier 88 capable of providing a notification to an occupant of the vehicle 10. The notifier 88 may be a speaker configured to provide an audible notification, such as the speakers of the infotainment system 84, a display 52 configured to visually show a notification, such as the display 52 of the infotainment system 84, or a feedback actuator that is configured to tactilely provide a notification, such as thorough vibration.

Figures 9, 10:
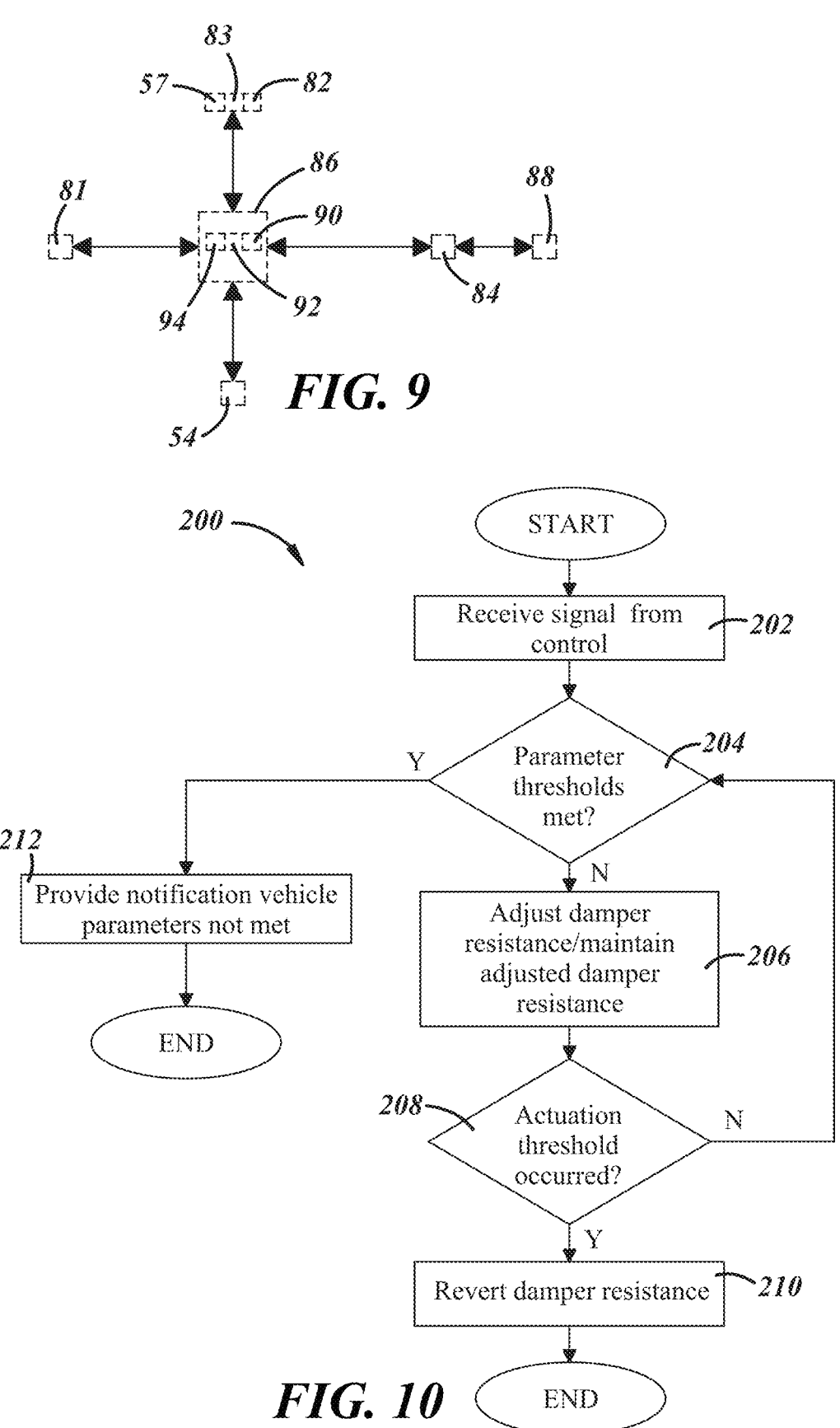
FIG. 9 is a schematic of vehicle components.
FIG. 10 is a flowchart of a method for adjusting a vehicle's damper resistance in anticipation of changing road conditions.

As shown by FIG. 9, the vehicle control system 86 is in communication with the control 54 and one or more of the dampers 72 of the vehicle 10 so that the control system 86 can adjust the compression resistance and/or rebound resistance of one or more of the dampers 72 in response to actuation of the control 54 by the operator of the vehicle 10. The control system 86 has one or more controllers or processors 90, memory 92 and instructions or programs 94 stored in the memory 92 or otherwise accessible by the processor(s) 90. In some implementations, the control system 86 may have or be defined by one or multiple vehicle controllers, such as but not limited to, a telematics module, body control module, powertrain control module, and the like, and the controllers may be independent or networked to each other. Each of the controllers may communicate with one or more vehicle components or system components.

In order to perform the functions and desired processing set forth herein, as well as the computations therefore, the control system 86 may include, but not be limited to, a processor(s) 90, computer(s), DSP(s), memory 92, storage, register(s), timing, interrupt(s), communication interface(s), and input/output signal interfaces, and the like, as well as combinations comprising at least one of the foregoing. For example, a controller 90 may include input signal processing and filtering to enable accurate sampling and conversion or acquisitions of such signals from communications interfaces and sensors. As used herein the terms controller 90 may refer to one or more processing circuits such as an application specific integrated circuit (ASIC), an electronic circuit, a processor 90 (shared, dedicated, or group) and memory 92 that executes one or more software or firmware programs 94, a combinational logic circuit, and/or other suitable components that provide the described functionality.

The term "memory" 92 or "storage" as used herein can include computer readable memory, and may be volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DR-RAM). The memory 92 can store an operating system and/or instructions/programs 94 executable by a processor 90 or controller or the like to enable control or allocate resources of a computing device.

As shown in FIG. 1, the vehicle 10 may encounter a dip 98, such as a pothole, trench, ditch or other feature in which a driving surface 96 extends away from the vehicle 10, and having a bottom that is vertically below the driving surface 96 ahead of the dip 98. The dip 98 may have a first section 100 that extends downward relative to the driving surface 96 ahead of the dip 98 and a second section 102 that extends upwards towards the driving surface 96 on the opposite side of the dip 98. The dip 98 may be large enough for one or more wheels 14 of the vehicle 10 to enter and be lowered relative to at least part of the vehicle 10, which causes an extension of the damper 72.

Figures 7, 8:
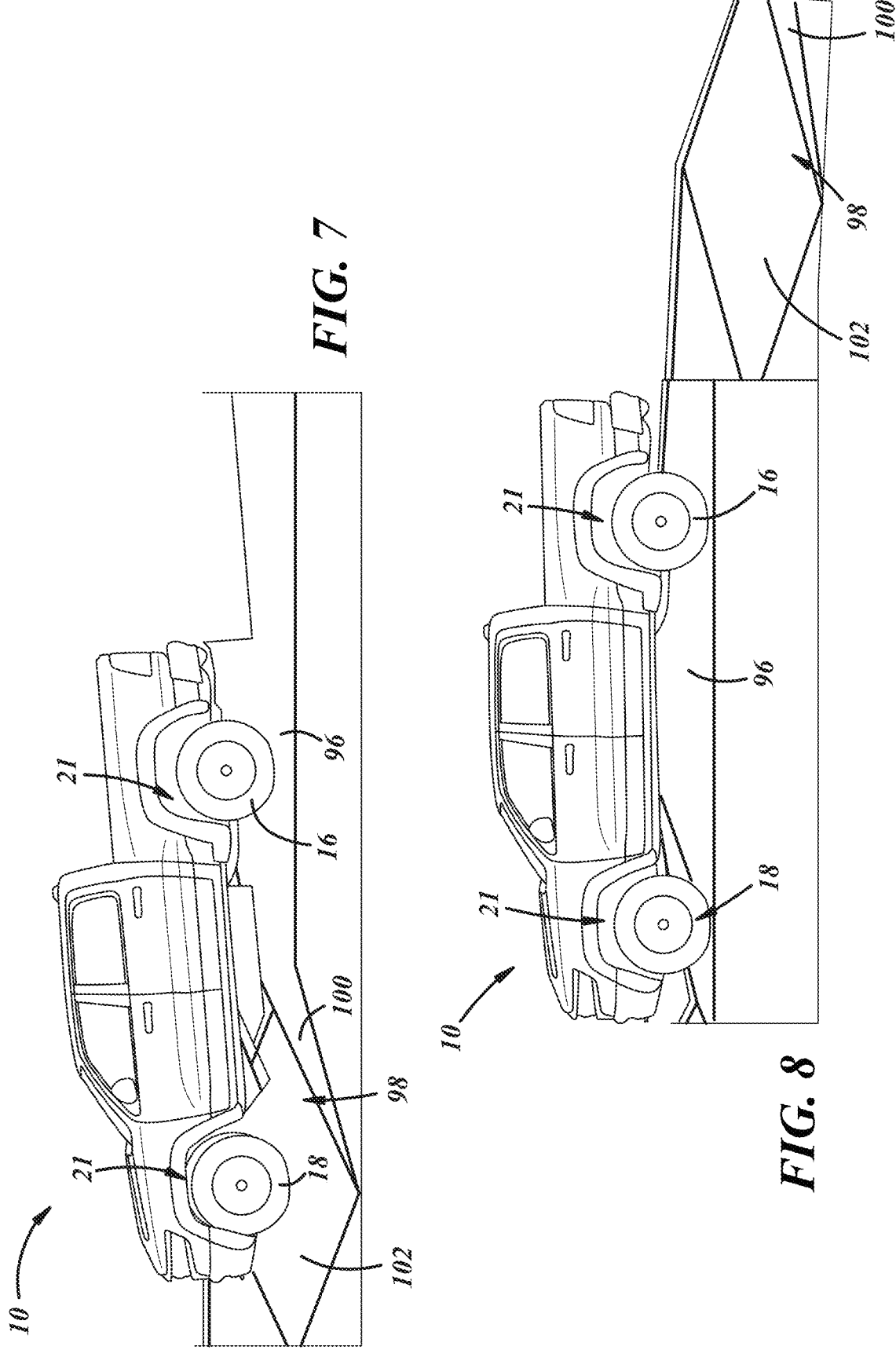
FIG. 7 is a side view of the vehicle within the dip of the driving surface.
FIG. 8 is a side view of the vehicle having exited the dip of the driving surface.

As shown in FIG. 7, when the front wheels 18 of the vehicle 10 are in the dip 98 and contact the upwardly inclined second section 102 of the dip 98, the suspension system 21 experiences compression, and the front wheels 18 are brought closer to the vehicle body 12 until, if the force on the vehicle 10 is sufficient, the dampers 72 and springs 70 are fully compressed (sometimes called being "bottomed out"). Once one or more components of the suspension system 21 are fully compressed, the momentum of the vehicle 10 against the road in the second portion of the dip 98 is transferred to the frame and body 12 of the vehicle 10, which may result in damage to the vehicle 10 (e.g. support or suspension components of the vehicle 10) and discomfort to vehicle occupants.

To improve vehicle dynamics when the vehicle 10 is about to enter a dip 98, the operator can actuate the control 54 prior to entering the dip 98. Actuation of the control 54 can provide the output that is received at the start of a method 200 for adjusting damper resistance in anticipation of changing road conditions, as shown in FIG. 10.

In step 202, the control system 86 receives the signal from the control 54 indicative that the operator has detected a dip 98 in the driving surface 96 and wishes to prepare the vehicle 10 for entering the dip 98. Upon actuation of the control 54 by the operator, which may be a button/switch within the passenger compartment 42 (FIG. 2) or on the steering wheel 56 (FIG. 3), the control system 86 receives an electronic signal via wired or wireless communication. Once the signal is received by the control system 86, the method 200 may continue to step 204.

In step 204, the control system 86 determines whether one or more vehicle parameters thresholds are met, for example, to ensure that the damper compression and/or rebound resistance can be adjusted safely. For example, the control system 86 may use a steering sensor 57 ensure that the steering angle of one or more wheels 14 of the vehicle 10 is less than a maximum steering angle (e.g. a road wheel steering angle threshold), which may in some implementations be 8 degrees or more, such as 10 degrees or 15 degrees, which may depend on the vehicle/suspension system of a vehicle. When the steering angle threshold is exceeded, adjustment of the dampers 72 may, in some instances, upset the stability of the vehicle 10, and so the control system 86 may prevent adjustment of the dampers 72 at greater steering angles. Furthermore, when the resistance of dampers 72 is increased for prolonged or repeated intervals, the dampers 72 may fatigue due to increased forces and heat experienced by the dampers 72. Therefore, if the dampers 72 have been above a predetermined compression resistance or rebound resistance for a predetermined threshold number of actuations of the control per a predetermined amount of time, or for a predetermined or threshold amount of time, the control system 86 may prevent the adjustment of the dampers 72. When one or more of the vehicle parameters are met, the control system 86 prevents adjustment of the dampers 72 and the method 200 continues to step 212. When the vehicle parameters are not met, the method 200 continues to step 206.

In step 206, the damper resistance is adjusted in response to the operator's actuation of the control 54 to prepare for a dip 98 in the driving surface 96. Because entering the dip 98 causes the suspension system 21 to compress, compression resistance of one or more dampers 72 may be increased from a first compression resistance to a second compression resistance, and in at least some implementations, may be increased to a maximum resistance or within 70% of the maximum resistance, with a further non-limiting example being between 85% of the maximum resistance and the maximum resistance. The increased resistance to compression can prevent the damper 72 from being fully compressed or bottoming out, or minimize the rate or force at which the damper 72 does bottom out to reduce the forces transmitted to the vehicle 10 and vehicle occupants.

Furthermore, upon actuation of the control 54, the rebound resistance of one or more dampers 72 may be adjusted to reduce the rebound resistance to extension/rebound of the damper(s) 72 from a first rebound resistance to a second rebound resistance. In at least some implementations, the rebound resistance may be reduced to a minimum resistance or within 30% of the minimum resistance of the damper(s), with a non-limiting further example of between 15% of the minimum and the minimum resistance. Reducing the rebound resistance permits the damper 72 and suspension system 21 to more freely move to and maintain an extended position. When the vehicle 10 is approaching a dip 98 in the driving surface 96, such as in FIG. 1, and subsequent compression of the suspension system 21 is imminent, it may be beneficial to maximize the height of the suspension system 21 (e.g. the extension of the dampers) to permit increased suspension travel and increase the distance the suspension system 21 is from bottoming out. By reducing the rebound resistance of the damper 72, the suspension system 21 may easily move towards the extended position, thus increasing the ride height and the suspension travel of the vehicle 10 before the vehicle enters the dip or while the vehicle enters the dip. When used in combination with increased compression resistance, decreased rebound resistance prepares the vehicle 10 to safely traverse a dip 98 in the driving surface 96. If in step 206, one or more dampers 72 are already set to increased compression resistance and decreased rebound resistance, the control system 86 may maintain the resistance of the dampers 72.

In at least some implementations, the front dampers 74 and rear dampers 76 may be adjusted differently. For example, if the weight distribution of the vehicle 10 is skewed towards the front 20, possibly due to the location of the engine or other heavy vehicle components, the front dampers 74 may be adjusted to have increased compression resistance and decreased rebound resistance relative to the rear dampers 76. Configuring the dampers 74 in this manner may increase the stability of the vehicle 10 as it traverses the dip 98. If the rear 22 of the vehicle 10 is significantly lighter in weight compared to the front 20 of the vehicle 10, the rear 22 may become unsettled or bounce over the dip 98. By decreasing compression resistance of the rear dampers 76 relative to the front dampers 74, the rear suspension can better absorb the impact of the rear wheels 16 with the dip 98, allowing the vehicle 10 to better traverse the dip 98.

In at least some implementations, in step 206, a notification is provided by the notifier 88 to indicate that the damper compression resistance and rebound resistance has been adjusted. As previously described, the notifier 88 may provide the notification so that it is receivable or detectable from within the passenger compartment 42 of the vehicle 10. For example, the notification may be visible on a display 52 or instrument cluster of the infotainment system 84, audible from a speaker within the passenger compartment 42, tactilely provided through vibration within the passenger compartment 42 (e.g. vibration of the steering wheel 56 or operator seat 46), or a combination of two or more ways of providing the notification.

Upon receiving the notification, the operator of the vehicle 10 may be informed that the damper compression resistance and rebound resistance has been adjusted. The operator can then expect the vehicle handling and ride to be altered in anticipation of the vehicle 10 traversing the dip 98 in the driving surface 96.

In step 208, the control system 86 determines whether actuation threshold has occurred. In at least some implementations, the control system 86 may monitor the amount of time that has elapsed since the dampers 72 have been adjusted. For example, the maximum amount of time the dampers 72 may be adjusted to the second compression resistance and/or second rebound resistance may be set to between five and ten seconds, or another value to prevent detrimental effects on the suspension system 21, as desired. When the control system 86 determines that the time threshold has not elapsed, the method 200 returns to step 206 where the damper resistance is maintained. When the control system 86 determines that the threshold time has elapsed, the method 200 continues to step 210.

Furthermore, in step 208, the control system 86 may determine that one or more vehicle parameters have changed subsequent to the damper adjustments of step 206. For example, the steering angle may have exceeded the predetermined allowed angle subsequent to the damper adjustments. To maintain control and stability of the vehicle 10, when one or more vehicle parameters are not met subsequent to the damper adjustments of step 206, the method 200 may continue to step 204.

In at least some implementations, in step 208, the control system 86 may determine that the vehicle 10 has traversed the dip 98 in the driving surface 96. For example, using one or more of the position sensor 82 of the dampers 72 or the suspension system 21 or one or more accelerometers 83 of the vehicle 10, the control system 86 may detect that the suspension 21 has been compressed beyond a predetermined amount as a result of entering/encountering the dip 98. When the front suspension of the vehicle 10 experiences significant compression and/or the vehicle 10 experiences significant acceleration in the vertical direction, the control system 86 may determine that the vehicle 10 has entered the dip 98 in the road. After the suspension experiences significant compression and/or significant acceleration in the vertical direction, the control system 86 may determine that the vehicle 10 has exited the dip 98 and the vehicle 10 may benefit from reverting to the previous damper configuration to maintain stability and ride quality. In at least some implementations, a predetermined or threshold amount of time after the control system 86 has determined that the vehicle 10 has left the dip 98, the method may continue to step 210.

In step 210, the compression resistance of the one or more dampers is reduced from the second compression resistance to or toward the first compression resistance. For example, the compression resistance of the one or more dampers may be reduced from the second compression resistance to or toward the first compression resistance and/or the rebound resistance of the one or more dampers may be increased from the second rebound resistance to or toward the first rebound resistance. In at least some implementations, the damper compression resistance and/or rebound resistance is/are reverted to the levels of resistance (first compression resistance, first rebound resistance) set prior to the adjustment in step 206. By reverting the dampers 72, the vehicle 10 may continue to travel on the driving surface 96 with normal or preset damper resistance and suspension function, as permitted prior to the damper adjustments of step 206. The method 200, may end after step 210.

In at least some implementations, in step 210, a notification is provided by the notifier 88 to indicate that the damper compression resistance has been reduced and/or the rebound resistance has been increased. As previously described, the notifier 88 may provide the notification so that it is receivable or detectable from within the passenger compartment 42 of the vehicle 10. For example, the notification may be visible on a display 52 or instrument cluster of the infotainment system 84, audible from a speaker within the passenger compartment, tactilely provided through vibration within the passenger compartment, or a combination of two or more ways of providing the notification.

Upon receiving the notification, the operator of the vehicle 10 may be informed that the damper compression resistance has been reduced and/or rebound resistance has been increased. With that information, the operator can expect the vehicle 10 to handle as expected based on the changed or previous damper settings/configuration. The method 200, may end after step 210.

When, in step 204, it is determined that one or more vehicle parameters are not met, in step 212, a notification is provided by the notifier 88 to indicate that the damper compression resistance and rebound resistance has not been adjusted in response to the actuation of the control 54. As previously described, the notifier 88 may provide the notification so that it is receivable or detectable from within the passenger compartment 42 of the vehicle 10. For example, the notification may be visible on a display 52 or instrument cluster of the infotainment system 84, audible from a speaker within the passenger compartment 42, tactilely provided through vibration within the passenger compartment 42, or a combination of two or more ways of providing the notification. In at least some implementations, the notification may provide the operator with the reason(s) why the dampers 72 were not adjusted. For example, the notification may indicate that the steering angle is above a predetermined maximum steering angle or that too many actuations of the control have occurred per a predetermined period.

Upon receiving the notification, the operator of the vehicle 10 may be informed that the damper compression resistance and rebound resistance have not been changed. In view of that, the operator can expect the vehicle 10 to handle as expected based on the previous damper settings/configuration. The method 200, may end after step 212. Therefore, the system and method 200 permits activation of a damper configuration to traverse a dip 98 in the driving surface 96 without requiring the operator to hold the control 54 while operating the vehicle 10, without overheating the dampers, and without impacting the handling of the vehicle 10.

With the systems and methods 200 described herein, with a single actuation of an input (e.g. the control 54), one or both of the damper compression and extension resistance can be adjusted. The input/control 54 need not remain actuated. That is, the input/control 54 can be momentarily actuated and then released and the damper adjustments are still made. Further, in at least some implementations, the input/control 54 need not be actuated a second time to revert the damper settings to the previous settings, and release of the input/control 54 does not itself cause reversion of the damper settings. Instead, the damper settings may be reverted upon passage of time and/or upon detection that the vehicle 10 has already passed through a dip 98. The damper settings can then be easily and reliably controlled by the operator which enables the operator to focus better on controlling the vehicle 10 into (FIGS. 1, 7) and out of the dip 98 (FIG. 8), and along the driving surface 96. Additionally, damage to the suspension components, that would otherwise be caused by leaving the damper settings in the adjusted state for too long, can be avoided or reduced with the systems and methods 200 that provide automatic reversion of the damper settings.

In at least some implementations, before the damper settings are reverted, the notifier 88 may provide a notice to the operator that the damper settings will be reverted within a short time (e.g. one or two seconds). This may enable the operator to again actuate the input/control 54 before that time expires to maintain the adjusted damper settings (e.g. avoid reversion) for another period or cycle, such as may be desirable when another dip 98 is present in the driving surface 96 and will soon be encountered by the vehicle 10. The system could limit the number of additional actuations that permit the adjusted damper settings to be maintained, to limit the duration of adjusted damper settings.

What is claimed is:

1. A method for adjusting a damper of a vehicle comprising:
   receiving a signal from a control;
   determining that one or more parameter thresholds are not met;
   increasing a compression resistance of one or more dampers from a first compression resistance to a second compression resistance;
   determining that an actuation threshold has occurred; and
   reducing the compression resistance of the one or more dampers from the second compression resistance to or toward the first compression resistance after the actuation threshold has occurred.

2. The method of claim 1, wherein the one or more parameter thresholds include a maximum steering angle of a wheel or that the one or more dampers have been above a predetermined level of compression resistance for a predetermined time or that an amount of actuations of the control per a predetermined amount of time is more than a predetermined amount.

3. The method of claim 1, wherein the second compression resistance is a maximum compression resistance.

4. The method of claim 3 wherein the one or more dampers includes front dampers of the vehicle, and the front dampers are adjusted to the maximum compression resistance.

5. The method of claim 4, which also includes adjusting the front dampers to a minimum rebound resistance.

6. The method of claim 1, wherein increasing the first compression resistance of the one or more dampers to the second compression resistance includes providing a notification to indicate that the compression resistance of the one or more dampers has been adjusted.

7. The method of claim 1, wherein determining that an actuation threshold has occurred includes determining that the one or more dampers have been compressed beyond a predetermined amount.

8. The method of claim 5, wherein reducing the compress resistance of the one or more dampers from the second compression resistance to or toward the first compression resistance includes reverting the front dampers from the maximum compression resistance to the first compression resistance and reverting the front dampers from the minimum rebound resistance to the rebound resistance prior to adjusting the rebound resistance to the minimum rebound resistance.

9. The method of claim 1, wherein the step of reducing the compression resistance of the one or more dampers includes providing a notification to indicate that the damper compression resistance has been reduced.

10. The method of claim 2, wherein the maximum steering angle is 8 degrees or greater.

11. A vehicle comprising:
    a frame configured to support components of the vehicle;
    a body supported by the frame, wherein the body defines an exterior of the vehicle and a passenger compartment within the body of the vehicle;
    a damper having a first end coupled to the frame and the damper has a second end that is movable relative to the first end;
    a wheel coupled with the second end of the damper, wherein the wheel and the second end of the damper can move relative to the frame;
    a control actuatable from within the passenger compartment; and
    a control system capable of receiving a signal from the control, determining that one or more parameter thresholds are not met, increasing a compression resistance of one or more dampers from a first compression resistance to a second compression resistance, determining that an actuation threshold has occurred, and reducing the compression resistance of the one or more dampers from the second compression resistance to or toward the first compression resistance.

12. The vehicle of claim 11, wherein the one or more parameter thresholds include a maximum steering angle of a wheel or that the one or more dampers have been above a predetermined level of compression resistance for a predetermined time or that an amount of actuations of the control per a predetermined amount of time is more than a predetermined amount.

13. The vehicle of claim 11, wherein increasing the first compression resistance of the damper to the second compression resistance includes adjusting one or more dampers to a maximum compression resistance.

14. The vehicle of claim 13, wherein front dampers of the vehicle are adjusted to the maximum compression resistance.

15. The vehicle of claim 14, which also includes adjusting the front dampers to a minimum rebound resistance.

16. The vehicle of claim 11, wherein increasing the first compression resistance of the damper to the second compression resistance includes providing a notification to indicate that the compression resistance of the one or more dampers has been adjusted.

17. The vehicle of claim 11, wherein determining that an actuation threshold has occurred includes determining that the one or more dampers have been compressed beyond a predetermined amount.

18. The vehicle of claim 15, wherein reducing the compression resistance of the one or more dampers from the second compression resistance to or toward the first compression resistance includes reducing the front dampers from the maximum compression resistance to the first compression resistance and increasing the front dampers from the minimum rebound resistance to the rebound resistance prior to adjusting the rebound resistance to the minimum rebound resistance.

19. The vehicle of claim 11, wherein reducing the compression resistance of the one or more dampers from the second compression resistance to or toward the first compression resistance includes providing a notification to indicate that the damper compression resistance has been changed.

20. The vehicle of claim 12, wherein the maximum steering angle is 8 degrees or greater.

\* \* \* \* \*